UNITED STATES PATENT OFFICE.

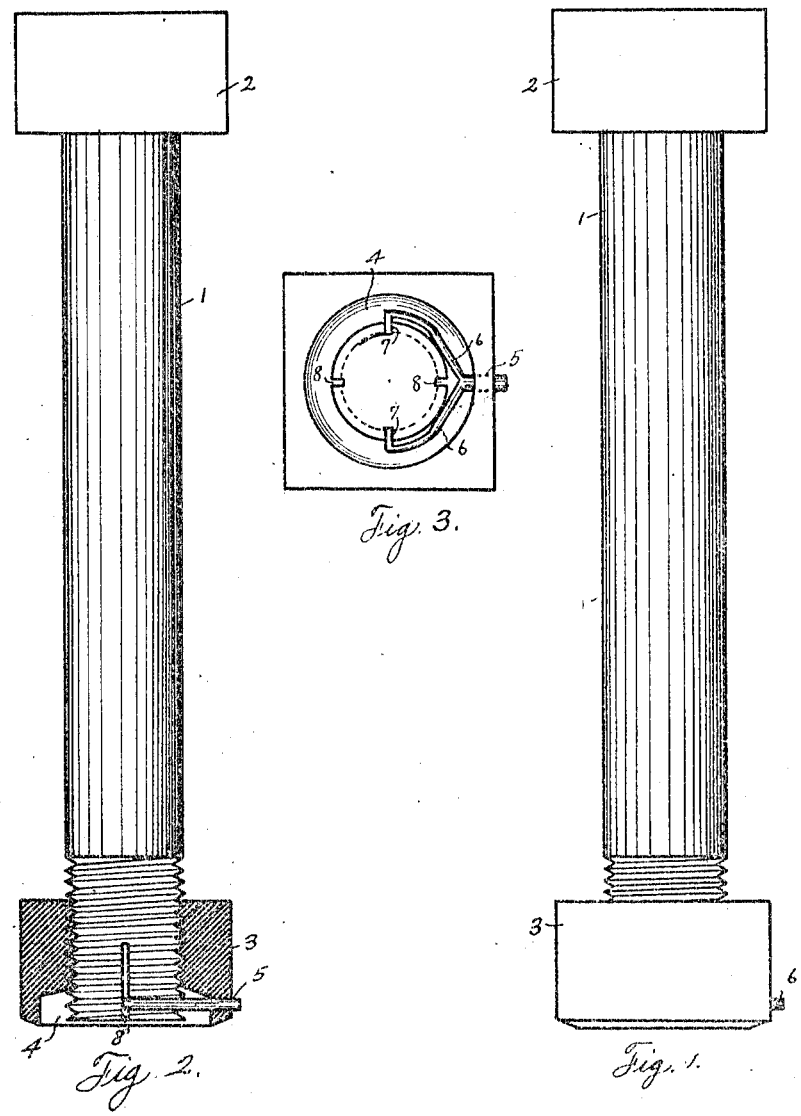

WHITFIELD H. EDWARDS, OF TAMINA, TEXAS.

NUT-LOCK.

1,105,763.   Specification of Letters Patent.   Patented Aug. 4, 1914.

Application filed October 14, 1913. Serial No. 795,040.

*To all whom it may concern:*

Be it known that I, WHITFIELD H. EDWARDS, a citizen of the United States, residing at Tamina, in the county of Montgomery and State of Texas, have invented certain new and useful Improvements in Nut-Locks, of which the following is a specification.

This invention relates to new and useful improvements in nut locks.

The object of the invention is to provide a device of the character described, whereby a nut may be securely locked upon the bolt upon which it is threaded, against accidental displacement therefrom, and is so constructed that, when a wrench is applied to the nut for turning the same, the locking device will be disengaged, so that the nut will be readily turned; but at all other times the nut will be locked against turning on the bolt.

A further feature of the invention resides in the provision of a device of this character which will be cheaply and easily constructed and which will not readily get out of repair.

With the above and other objects in view, the invention has particular relation to certain novel features of construction, arrangement of parts, and use, an example of which is given in this specification and illustrated in the accompanying drawings, wherein—

Figure 1 shows a side elevation of the bolt, showing the nut locked thereon. Fig. 2 shows a side elevation of the bolt, showing the nut in section and the locking device applied thereto, and Fig. 3 shows an end view of the bolt showing the locking device in plan view.

Referring now more particularly to the drawings, wherein like numerals of reference designate similar parts in each of the figures, the numeral 1 refers to a bolt, one end of which carries the usual head 2, and the other end of which is exteriorly threaded to receive the nut 3. This nut is interiorly threaded in the well known manner; but the passageway through the nut is enlarged at its outer end, forming an annular space 4 around the extreme end of the bolt 1 and extending from this space through the surrounding wall of the nut is an orifice 5 through which the stem of the Y-shaped member 6 passes. This member has two prongs which embrace the free end of the bolt 1, as shown in Fig. 3 and the free ends of said prongs have inwardly extending catches 7, 7. The periphery of the free end of the bolt 1 is provided with a plurality of lengthwise slots 8 and the catches 7 normally engage in two opposing slots and thereby lock the nut against turning relative to the bolt. The prongs 6 are formed of strong flexible material and when a wrench is applied to the nut, it will press against the outer end of the stem and force it inwardly toward the bolt, causing the bolt to wedge between the prongs thereby forcing the free ends of said prongs outwardly and disengaging the catches 7 from the slots 8 and permitting the nut to turn on the bolt. The annular space 4 is of a sufficient width to permit this movement of the prongs 6. When the wrench has been removed from the nut the resistance of the prongs 6 against the bolt will be sufficient to force the stem outwardly to its original position and the catches 7 will again seat against the bolt and when the nut is turned a sufficient distance to bring said catches opposite the slots 8, the catches will then engage in said slots and the nut will be locked against further turning on the bolt.

What I claim is:—

1. In a device of the character described, the combination with a bolt and a nut threaded thereon, of a Y-shaped member formed of a stem and two flexible prongs, the stem having slidable engagement with the nut and the prongs embracing the bolt, the free ends of said prongs having detachable engagement with the bolt.

2. A device of the character described, comprising a bolt, one end of which is outwardly threaded, said end having a plurality of lengthwise slots arranged around the periphery thereof, a nut having a tapped hole extending therethrough, whose outer end is enlarged so as to form an annular space between said nut and bolt, said nut also having an orifice extending from said annular space through the wall thereof, a Y-shaped member comprising a stem and two flexible prongs, said stem extending through said orifice and said prongs embracing said bolt, an inwardly extending catch carried by the free end of each prong, said catches normally engaging in opposing slots of said bolt.

In testimony whereof I have signed my name to this specification in the presence of two subscribing witnesses.

WHITFIELD H. EDWARDS.

Witnesses:
 FRED. W. STEPLETON,
 MAY MONTGOMERY.